United States Patent
Martin

(10) Patent No.: US 11,963,480 B2
(45) Date of Patent: Apr. 23, 2024

(54) HEADER FORE/AFT TILT CONTROL FOR COMBINE HARVESTER

(71) Applicant: CNH Industrial America LLC, New Holland, PA (US)

(72) Inventor: Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 508 days.

(21) Appl. No.: 17/166,514

(22) Filed: Feb. 3, 2021

(65) Prior Publication Data

US 2022/0240446 A1    Aug. 4, 2022

(51) Int. Cl.
*A01D 75/28* (2006.01)
*A01D 41/14* (2006.01)

(52) U.S. Cl.
CPC ......... *A01D 41/141* (2013.01); *A01D 75/287* (2013.01)

(58) Field of Classification Search
CPC ............................ A01D 41/141; A01D 75/287
See application file for complete search history.

(56) References Cited

U.S. PATENT DOCUMENTS

| | | | |
|---|---|---|---|
| 5,359,836 A | 11/1994 | Zeuner et al. | |
| 6,615,570 B2 | 9/2003 | Beck et al. | |
| 7,222,474 B2 | 5/2007 | Rayfield et al. | |
| 8,560,182 B2 | 10/2013 | Ringwald et al. | |
| 10,111,380 B2 | 10/2018 | Long et al. | |
| 10,159,182 B2 * | 12/2018 | Berggren | A01B 63/023 |
| 11,497,164 B2 * | 11/2022 | Martin | A01B 63/002 |
| 2007/0163220 A1 * | 7/2007 | Ehrhart | A01D 41/145 56/10.2 E |
| 2018/0054964 A1 * | 3/2018 | Füchtling | A01D 41/127 |
| 2018/0070531 A1 | 3/2018 | Long et al. | |
| 2018/0255706 A1 * | 9/2018 | Smith | A01D 41/145 |
| 2018/0271016 A1 * | 9/2018 | Milano | A01D 33/14 |
| 2018/0332768 A1 * | 11/2018 | Isaac | A01D 41/06 |
| 2019/0230855 A1 | 8/2019 | Reed et al. | |
| 2020/0000034 A1 | 1/2020 | Schlipf | |
| 2020/0053961 A1 * | 2/2020 | Dix | A01D 43/085 |
| 2020/0077584 A1 * | 3/2020 | Miller | A01D 41/145 |
| 2020/0375092 A1 * | 12/2020 | Pankaj | A01D 41/141 |

(Continued)

FOREIGN PATENT DOCUMENTS

| | | | | |
|---|---|---|---|---|
| DE | 19647523 A1 * | 5/1998 | ........... | A01B 79/005 |
| DE | 102020119291 A1 * | 1/2022 | ......... | A01D 41/1274 |

(Continued)

OTHER PUBLICATIONS

Extended European Search Report for EP Application No. 22154763.1 dated Jun. 20, 2022 (seven pages).

*Primary Examiner* — Adam J Behrens
(74) *Attorney, Agent, or Firm* — Peter K. Zacharias; Rebecca L. Henkel; Rickard K. DeMille

(57) ABSTRACT

A header positioning system for controlling a position of a header for a combine harvester. The header positioning system including a controller that is configured to receive signals corresponding to (i) a measured inclination of either the header or the combine, (ii) a measured ground speed of the header or the combine, and (iii) a measured height of the header with respect to ground. The controller is further configured to adjust a height and a pitch of the header as a function of the inclination, measured ground speed and the measured height.

21 Claims, 2 Drawing Sheets

(56) References Cited

U.S. PATENT DOCUMENTS

| | | | | |
|---|---|---|---|---|
| 2020/0375106 A1* | 12/2020 | Seiders, Jr. | .......... | A01D 41/145 |
| 2021/0059117 A1* | 3/2021 | Hunt | .................... | A01D 41/148 |
| 2021/0153434 A1* | 5/2021 | Hunt | .................... | A01D 41/127 |
| 2021/0289702 A1* | 9/2021 | Jung | ...................... | A01D 75/00 |
| 2022/0110238 A1* | 4/2022 | Vandike | ............... | G05D 1/0274 |
| 2022/0264798 A1* | 8/2022 | Martin | ................. | A01D 41/141 |

FOREIGN PATENT DOCUMENTS

| | | | | |
|---|---|---|---|---|
| EP | 2775818 B1 | | 8/2019 | |
| EP | 4085746 A1 * | | 11/2022 | ......... A01D 41/1274 |
| WO | 2018213439 A1 | | 11/2018 | |
| WO | WO-2020102209 A1 * | | 5/2020 | ........... A01D 41/127 |

\* cited by examiner

HEADER FORE/AFT TILT CONTROL FOR COMBINE HARVESTER

FIELD OF THE INVENTION

The present invention relates to a system for adjusting a position of a header of a combine harvester based upon various factors.

BACKGROUND OF THE INVENTION

As is described in U.S. Pat. No. 7,222,474 to CNH America LLC (the '474 Patent), which is incorporated by reference in its entirety and for all purposes, the height of a header of a combine harvester is capable of being adjusted. Header height is typically adjusted depending upon the type of crop being harvested by the combine. The header height is also adjusted to conform to the changing contours of the ground. More particularly, combines typically include ground contact sensors to detect the distance between the header or cutter bar and the ground. The height of the header is adjusted based upon the input of the ground contact sensors. The header height (e.g., the distance from the cutterbar to the ground—see 'H' in FIG. 1) can also be adjusted by changing the pitch of the header. More particularly, the pitch of the header can be adjusted by rotating the header in the fore-aft direction (i.e., about the longitudinal axis of the header and cutter bar).

It has been discovered that changing the pitch of the header produces a lower reaction force on the combine than does changing the height of the header. This occurs because the inertia of the fore-aft tilt degree of freedom is lower than the inertia of the height adjustment degree of freedom. Accordingly, the operator of the combine will physically feel adjustments to the height of the header to a greater degree than adjustments to the pitch of the header. Stated differently, adjustments to the pitch of the header result in a smoother ride than do adjustments to the height of the header.

Additionally, in most combines, changing the pitch of the header is a relatively speedy operation as compared with changing the height of the header.

In view of the foregoing, as a combine traverses uneven ground (e.g., terrace, hill or steep surface) it would be desirable to automatically adjust the height and/or pitch of a header in the interest of enhancing ride quality.

It is noted that although various features are described in the Background section, the inclusion of such features in the Background section is not an admission that such features represent prior art.

SUMMARY OF THE INVENTION

According to one aspect of the invention, a header positioning system for controlling a position of a header for a combine harvester is provided. The header positioning system including a controller that is configured to receive signals corresponding to (i) a measured inclination of either the header or the combine, (ii) a measured ground speed of the header or the combine, and (iii) a measured height of the header with respect to ground. The controller is further configured to adjust a height and a pitch of the header as a function of the inclination, measured ground speed and the measured height.

According to another aspect of the invention, method of controlling a position of a header for a combine harvester is provided. The method comprises measuring an inclination of either the header or the combine; measuring a height of the header with respect to ground; measuring a ground speed of the header or the combine; and adjusting a height and a pitch of the header as a function of the measured inclination, ground speed and height.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
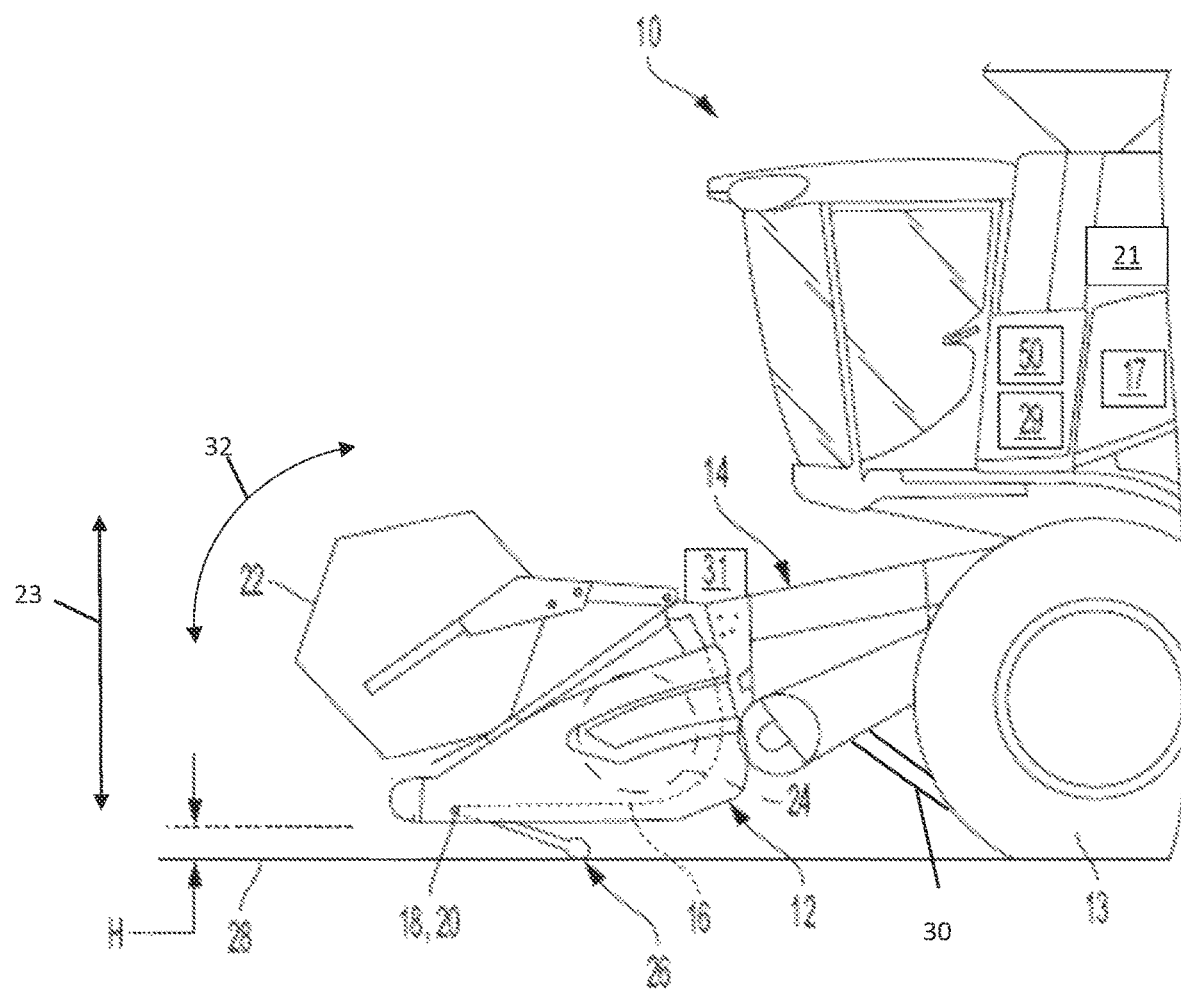
FIG. 1 is a side view of a front end of an agricultural combine harvester having a header (with a cutter bar) in a raised position above the ground, the header including a ground sensing apparatus.

Corresponding reference characters indicate corresponding parts throughout the several views. The exemplification set out herein illustrates an embodiment of the invention, in one form, and such exemplification is not to be construed as limiting the scope of the invention in any manner.

For convenience of reference and understanding in the following discussions, and with respect to the various drawings and their descriptions, the point of reference for the use of various terms that are hereafter employed, including "left", "right", "forward", "rearward", "front", "back", "top", and "bottom", should generally be considered to be taken from a point at the rear of the combine harvester machine facing in its normal direction of travel, unless it is clear from the discussion and context that a different point of reference is appropriate. Any use of such terms should therefore be considered exemplary and should not be construed as limiting or introducing limitations.

Moreover, inasmuch as various components and features of harvesters and fan assemblies are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

Turning now to the drawings, wherein a preferred embodiment of the invention is shown, in FIG. 1 a front end of an agricultural combine 10 is shown including a conventional header 12 supported on a feeder 14, for cutting or severing crops, and inducting the severed crops into feeder 14 for conveyance into combine 10 for threshing and cleaning as the combine 10 moves forwardly over a field. Header 12 includes a bottom or pan 16 which is supported in desired proximity to the ground surface of the field during the harvesting operation. An elongate, sidewardly extending cutter bar 18 supporting elongate, reciprocally movable sickle knives 20 (for example) is disposed along a forward edge of pan 16. The cutter bar 18 severs the crop for induction into the header 12 for threshing by a rotor and concave (not shown, but described in U.S. Pat. No. 8,092,286, which is incorporated by reference in its entirety). An elongate, sidewardly extending reel 22 is disposed above pan 16 and is rotatable in a direction for facilitating induction of the severed crops into header 12. An elongate, rotatable auger 24 extends in close proximity to a top surface of pan 16 and has spiral flights therearound (not shown) which convey the severed crops to feeder 14 for induction into combine 10. The front wheels 13 (or tracks) of the combine 10 are shown in FIG. 1.

Combine 10 includes a ground speed sensor 17 for sensing the ground speed of the combine 10 during operation. The ground speed sensor 17 may be a speedometer, GPS, or other speed sensing device of the combine 10, as is known in the art.

Header 12 includes a ground height sensor 26 constructed and operable according to teachings of the present invention, for sensing or contacting the ground surface 28 of a field residing directly beneath the header 12. The ground height sensor 26 is positioned either at or behind cutter bar 18. The ground height sensor 26 is configured to provide information relating to (i) the contour of the ground 28 directly beneath the header, (ii) contact with the ground, and/or (iii) the height 'H' of the cutter bar 18 (or another point on the header 12) with respect to the ground 28 at the current position of header 12, for example. Ground height sensor 26 transmits that information to one or more controllers 50. Ground height sensor 26 does not necessarily have to contact the ground, and, may be a non-contact sensor that may utilize LIDAR, RADAR, or SONAR, and/or ground sensor 26 may be ultrasonic sensor or camera. Further details of the ground sensor 26 are provided in the '474 Patent.

A hydraulic motor 29 raises and lowers the feeder 14 via hydraulic pistons 30 (otherwise referred to as lift cylinders) in a vertical direction 23, as is known in the art. Header 12, which is connected to feeder 14, moves along with feeder 14. Alternatively, motor 29 could raise or lower the header 12 independently of the feeder 14. It is noted that the vertical motion does not necessarily have to be absolutely vertical. For example, the vertical motion may follow an arc trajectory.

A hydraulic motor 31 is configured to adjust the pitch of the header 12, i.e., rotate the header 12 in the fore-aft direction and about the longitudinal axis of header 12. See the double head arrows 32 in FIG. 1 indicating pitch adjustment of header 12.

An inclination sensor 21 (e.g., an inclinometer) is disposed on the combine. Alternatively, sensor 21 could be disposed on the housing of header 12. Inclination sensor 21 senses the level of incline of the combine itself or the header 12 relative to the Earth's gravity. Inclinometers, also called tilt sensors, clinometers or slope sensors, are designed to measure the angle of an object (e.g., the combine or header) with respect to the force of gravity. The inclinometer determines the pitch and/or roll angle and outputs these values via an electrical interface. According to this embodiment, the inclination sensor 21 senses the pitch of the combine (or header), however, inclination sensor 21 could also sense the roll of the combine (or header).

Combine 10 also includes a controller 50 configured to receive signals from the above-described sensors for controlling the above-described motors. Further details concerning controller 50 will be described with reference to FIGS. 2 and 3.

Figure 2:
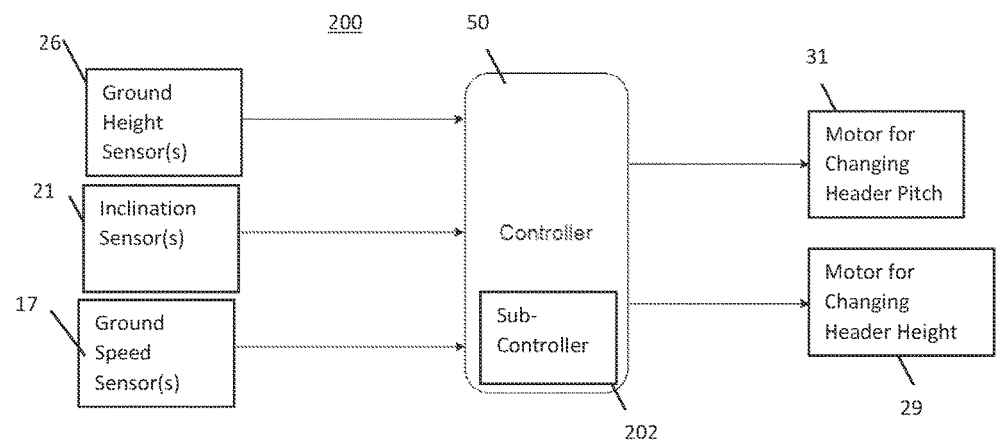
FIG. 2 is a schematic block diagram of a system for controlling header position.

FIG. 2 is a schematic block diagram of a header positioning system 200 for controlling the header position of the combine 10. In the combine 10, the header positioning system 200 comprises the controller 50, that receives signals from the sensors 17, 21 and 26, and transmits instructions to actuate the motors 29 and 31 to raise, lower and/or adjust the pitch of the header 12 based upon the signals from the sensors 17, 21 and 26, as will be described in greater detail with reference to FIG. 3. The controller 50 performs other function related to the operation of combine 10, and accordingly may be associated with other systems of the combine 10. The controller 50 includes a sub-controller 202 that is specifically responsible for changing the position (raise/lower/pitch movement) of the header 12 in an automatic mode. Sub-controller 202 may be either separate from or integrated with controller 50. Alternatively, controller 50 may perform the functionality of sub-controller 202, and sub-controller 202 may be omitted.

Figure 3:
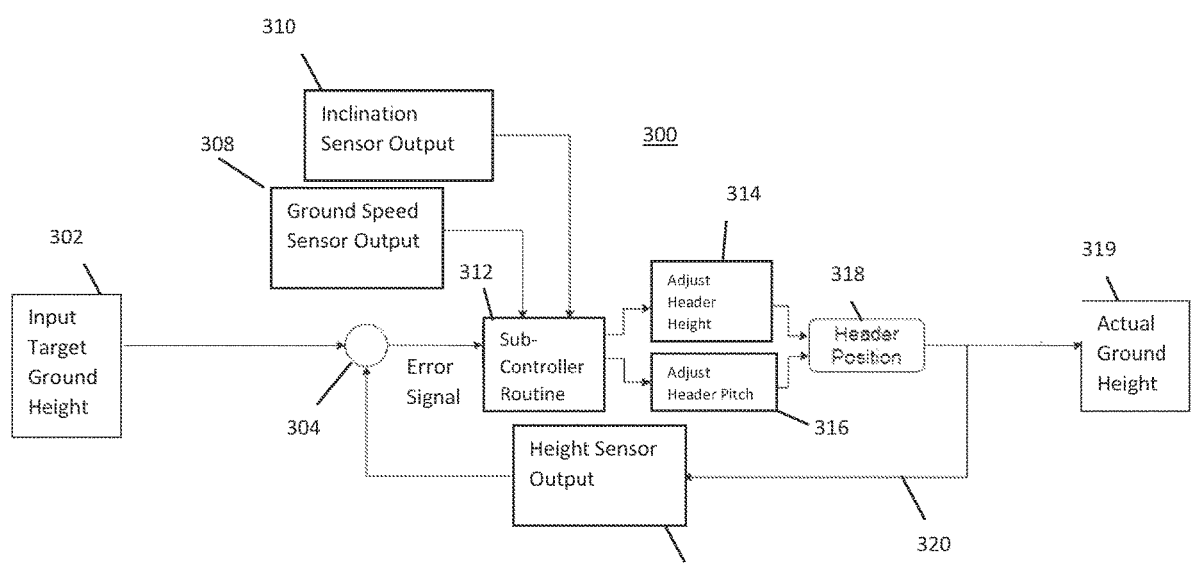
FIG. 3 is a flow chart for controlling header position.

FIG. 3 depicts a method 300 for controlling a position of the header 12 of the combine 10. At step 302, the target ground height is input to the controller 50. The target ground height may be either a value that is input by a user or a value that is automatically calculated by the combine. At step 303, the current ground height, as measured by ground height sensors 26, is also input to controller 50. At step 304, the controller 50 compares the measured ground height against the target ground height, and transmits the difference, in the form of an error signal, to the sub-controller 202. At steps 308 and 310, the output signals from ground-speed sensors 17 and inclination sensor 21, respectively, are input to the sub-controller 202.

At step 312, sub-controller 202 performs a routine for controlling the height and pitch positions of the header 12 based upon the data received from steps 304, 308 and 310. The details in connection with the routine at step 312 will be described later. Based upon the output of the routine at step 312, at step 314, the sub-controller 202 transmits a first scaled error signal to motor 29 for adjusting the header height 'H.' And, based upon the output of the routine at step 312, at step 316, the sub-controller 202 transmits a second scaled error signal to motor 31 for adjusting the header pitch. At step 318, upon receiving the respective signal(s), motor 29 either raises or lowers the header 12, and/or, motor 31 pivots the header 12, as dictated by the first and second scaled error signals. The header 12 ultimately reaches the target ground height at step 319 either in one step or incrementally as part of a PID loop, for example. This method 300 is repeated as the ground height changes and/or the target ground height changes. In particular, at step, controller 202 is configured to convert the error signal at step 304 into two scaled error signals and transmit those scaled error signals to the motors 29 and 31, respectively, for adjusting the position of the header 12 by raising/lowering the header and/or pitching the header.

The scaling process is described hereinafter. Using the inclination sensor output (I) at step 310, the sub-controller 202 calculates the derivative of inclination (dI/dt). For purposes of calculating the derivative, time can be supplied from a clock associated with controller 202. The sub-controller 202 also receives the ground speed (dx/dt) at step 308. Sub-controller 202 then calculates the quotient of the derivative of inclination (dI/dt) and the ground speed (dx/dt) to arrive at the quotient dI/dx. Quotient dI/dx is a measure of the change of inclination with respect to distance travelled.

The value of quotient dI/dx may be (i) at or near zero, (ii) a positive value, or (iii) a negative value. A zero value indicates that the inclination of the combine is not changing to a notable degree over a distance travelled. A positive value indicates that the combine is entering an upwardly sloped region in the direction of travel (e.g., terrace). A negative value indicates that the combine is entering a downwardly sloping region in the direction of travel.

As noted above, using the outputs at steps 304, 308 and 310 as an input, controller 202 is configured to convert the error signal at step 304 into two scaled error signals, namely, 'pitch control scaled error signal' and 'height control scaled error signal.' Controller 202 transmits 'pitch control scaled error signal' and 'height control scaled error signal' to the motors 31 and 29 at steps 316 and 314, respectively, for adjusting the position of the header 12.

The two scaled error signals could be computed by controller 202 in accordance with a look-up table stored in the memory of controller 202, or as a function of an algorithm. An exemplary lookup table is shown below.

In the look-up table, the ground speed and indication derivatives are input calculated values. Calculated dI/dx is an input calculated value based upon the ground speed and the inclination derivative inputs. Once dI/dx is calculated, that value is assigned to the closest Factory Set dI/dx value (as shown in the table). The pitch and height control scaling factors, which are both factory set values, are assigned based upon the assigned Factory Set dI/dx value.

sloped region, there is a minimal risk of undesirably lodging the knives of the header into the ground. For that reason, the position of the header 10 is adjusted using (primarily) pitch adjustment by scaling the 'error signal' accordingly. According to Example 2 of the Table, the position of the header 10 is adjusted using pitch and raise/lower adjustment, with pitching of the header at step 316 being weighted more heavily than raising/lowering of the header at step 314. The pitch control scaled error signal is '8' and the height control scaled error signal is '2.' Thus, the ground height position at step 319 is reached to a greater degree by pitching of the header at step 316 than by raising/lowering of the header at step 314. Specifically, the pitch of the header 12 is changed such that knives 20 move further from the ground. It is noted that changing the pitch of the header 12 moves header 12 closer toward a "protection position" in which the sharp ends of the knives 20 are rotated away from the ground.

In Example 4 in the Table, the combine is nearing the top of the sloped region, as evidenced by the comparatively large value of dI/dx. At that point, the ground height sensors 26 detect a large distance between the ground and the header. To compensate for the large distance, the position of the header 12 is adjusted downward toward the ground using height adjustment by scaling the 'error signal' accordingly. But, because there is also a risk of undesirably lodging the knives of the header into the ground while the combine is Table of Exemplary Values

| Example No. | Ground Speed (dx/dt) [ft/s] [input] | Inclination Derivative (dI/dt) [%/s] [input] | Calculated dI/dx [%/ft] [input] | Closest Factory Set dI/dx [%/ft] [factory set] | 'Error Signal' outputted at step 304 [input] | Pitch Control Scaling Factor [%] [factory set] | Height Control Scaling Factor [%] [factory set] | Pitch Control Scaled Error Signal [output] | Height Control Scaled Error Signal [output] |
|---|---|---|---|---|---|---|---|---|---|
| 1 | 5 | 0 | 0 | 0 | 10 | 100 | 0 | 10 | 0 |
| 2 | 5 | 5.1 | 1.02 | 1 | 10 | 80 | 20 | 8 | 2 |
| 3 | 5 | 9.8 | 1.96 | 2 | 10 | 60 | 40 | 6 | 4 |
| 4 | 5 | 51 | 10.2 | 10 | 10 | −20 | 120 | −2 | 12 |
| 5 | 5 | −5.1 | −1.02 | −1 | 10 | 20 | 80 | 2 | 8 |
| 6 | 5 | −10.2 | −2.04 | −2 | 10 | 40 | 60 | 4 | 6 |

Also, it should be understood in viewing the Table that the 'pitch control scaled error signal' is the product of the 'pitch control scaling factor' and the 'height error signal'; and, the 'height control scaled signal' is the product of the 'height control scaling factor' and the 'height error signal.' The sum of the pitch and height control scaling factors is equal to 100%. The height error signal is set to a value of 10 in each row for the purpose of simplicity, however, the error signal can vary based upon step 304. It is also noted that the sum of the 'pitch control scaled error signal' and the 'height error scaled error signal' equal the 'error signal.'

In Example 1 in the Table, the combine is not encountering a change in inclination over a travelled distance. According to the Table, the position of the header 10 is adjusted using (only) pitch adjustment. The pitch control scaled error signal is '10' and the height control scaled error signal is '0.' Thus, the pitch control scaled error signal transmitted at step 316 results in pitching of the header. And, the height control scaled error signal transmitted at step 314 does not result in raising or lowering of the header. As noted above, adjustments to the pitch of the header result in a smoother ride as compared with raising the header using the motor 29 at step 314.

In Examples 2 and 3 in the Table, the combine is entering an upwardly sloped region. Upon entering the upwardly travelling along an upward slope, the header is pitched away from the ground by scaling the 'error signal' accordingly.

In Examples 5 and 6 in the Table, the combine is entering an downwardly sloped region. In contrast to travelling uphill, there is a higher risk of undesirably lodging the knives of the header into the ground once the downwardly sloped region shifts to a flat region or an upwardly sloped region. For that reason, once the combine enters a downwardly sloping region, the position of the header 12 is adjusted using (primarily) height adjustment by scaling the 'error signal' accordingly. According to Example 4 of the Table, the position of the header 10 is adjusted using pitch and raise/lower adjustment, with raising/lowering of the header at step 314 being weighted more heavily than pitching of the header at step 316. The pitch control scaled error signal is '2' and the height control scaled error signal is '8.' Thus, the ground height position at step 319 is reached to a greater degree by raising/lowering of the header at step 314 than by pitching of the header at step 316. It is also noted that at step 316, the header 12 is pitched to the "protection position" in which the knives are rotated away from the ground.

Although some of the above steps were carried out by controller 50 and other steps were carried out by sub-controller 202, it should be understood that either one of those controllers could perform all of the above-described steps, if so desired. Also, the method 300 is not limited to any step or sequence of steps.

It is to be understood that the above-described operating steps are performed by the controller 50/202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 50/202 described herein, such as the aforementioned method of operation, is implemented in software code or instructions which are tangibly stored on the tangible computer readable medium. Upon loading and executing such software code or instructions by the controller, the controller may perform any of the functionality of the controller described herein, including any steps of the aforementioned method described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. For example, there may be other inputs to the routine including, but not limited to, Machine Configuration Geometries, Operator Selected Setpoints (Ground Height and Header Pitch), and Operating Position of Pitch Degree of Freedom (not at end of stroke), and so forth. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A header positioning system for controlling a position of a header for a combine harvester, the header positioning system comprising:
a controller that is configured to receive signals corresponding to (i) a measured inclination of either the header or the combine, (ii) a measured ground speed of the header or the combine, and (iii) a measured height of the header with respect to ground,
wherein the controller is configured to apportion an adjustment of the position of the header between a vertical height adjustment and a pitch adjustment as a function of the measured inclination, measured ground speed and measured height, and
wherein the controller is configured to adjust both (i) a vertical height of the header based on the vertical height adjustment apportioned by the controller and (ii) a pitch of the header based on the pitch adjustment apportioned by the controller.

2. The header positioning system of claim 1 further comprising a ground speed sensor that is configured for sensing the ground speed of the combine and transmitting the measured ground speed to the controller.

3. The header positioning system of claim 1 further comprising an inclination sensor that is configured for sensing an inclination of the combine or the header and transmitting the measured inclination to the controller.

4. The header positioning system of claim 1 further comprising a header height sensor that is configured for sensing the height of the header with respect to the ground and transmitting the sensed height to the controller.

5. The header positioning system of claim 1 further comprising a first motor for changing the pitch of the header, wherein the controller is configured to adjust the pitch of the header by activating the first motor.

6. The header positioning system of claim 1 further comprising a second motor for changing the height of the header, wherein the controller is configured to adjust the height of the header by activating the second motor.

7. The header positioning system of claim 1, wherein the controller is configured to adjust the vertical height and the pitch of the header as a function of the inclination, ground speed and height and in accordance with scaled height values and scaled pitch values stored in a Table.

8. The header positioning system of claim 1 wherein the signal corresponding to the measured height is an error signal that is equal to the difference between the measured height of the header and a predefined target height value for the header.

9. A header for a combine harvester comprising the header positioning system of claim 1.

10. A combine harvester further comprising the header positioning system of claim 1.

11. An agricultural vehicle further comprising the header positioning system of claim 1.

12. A method of controlling a position of a header for a combine harvester, the method comprising:
measuring an inclination of either the header or the combine;
measuring a height of the header with respect to ground;
measuring a ground speed of the header or the combine;
apportioning an adjustment of the position of the header between a vertical height adjustment and a pitch adjustment as a function of the measured inclination, measured ground speed and measured height; and
adjusting (i) a vertical height of the header based on the vertical height adjustment apportioned by the controller and (ii) a pitch of the header based on the pitch adjustment apportioned by the controller.

13. The method of claim 12, wherein the height and the pitch of the header are adjusted simultaneously by different motors.

14. The method of claim 12, wherein the vertical height of the header is adjusted by activating a motor that either raises or lowers a feeder of the combine harvester to which the header is attached.

15. The method of claim 12, wherein the pitch of the header is adjusted by activating a motor that is configured to rotate the header.

16. The method of claim 12, further comprising generating a ground height error signal as a function of the measured height and a predefined target height value for the header.

17. The method of claim 16 further comprising generating a pitch control scaled error signal as a function of the ground height error signal, the measured ground speed and the measured inclination, wherein the pitch control scaled error signal is the product of the ground height error signal and a pitch control scaling factor, and wherein the pitch control scaling factor is a factory set value that is assigned based upon the measured ground speed and the measured inclination.

18. The method of claim 17 further comprising generating a height control scaled error signal as a function of the ground height error signal, the measured ground speed and the measured inclination, wherein the height control scaled error signal is the product of the ground height error signal and a height control scaling factor, wherein the height control scaling factor is a factory set value that is assigned based upon the measured ground speed and the measured inclination.

19. The method of claim 12, wherein the vertical height and the pitch of the header are adjusted by different motors.

20. The method of claim 12, wherein the apportioning step comprises (i) calculating a derivative of the measured inclination, (ii) calculating a quotient value equal to a quotient of the derivative and the ground speed, and (iii) apportioning the adjustment of the position of the header between the vertical height adjustment and the pitch adjustment as a function of the calculated quotient value.

21. The header positioning system of claim 1, wherein the controller is configured to (i) calculate a derivative of the measured inclination, (ii) calculate a quotient value equal to a quotient of the derivative and the ground speed, and (iii) apportion the adjustment of the position of the header between the vertical height adjustment and the pitch adjustment as a function of the calculated quotient value.

\* \* \* \* \*